June 25, 1957 — E. S. TAMM — 2,796,893
COFFEE DISPENSING MACHINE
Filed Aug. 1, 1955 — 3 Sheets-Sheet 1
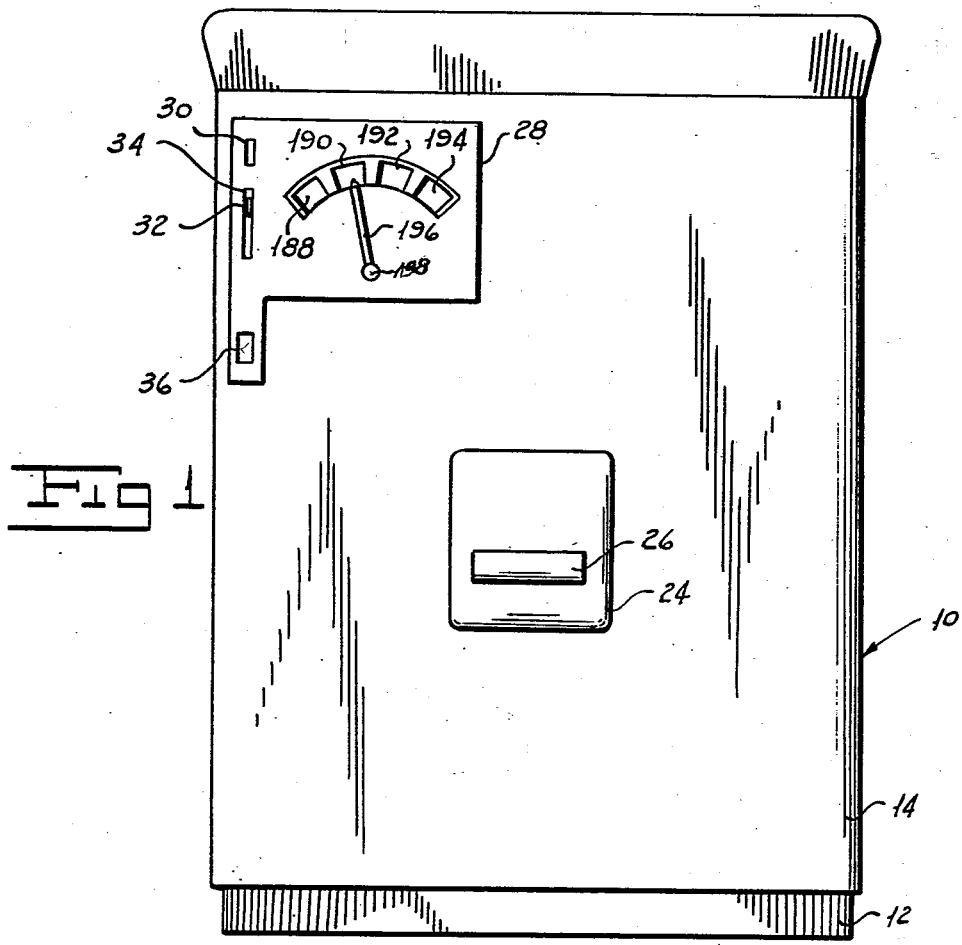
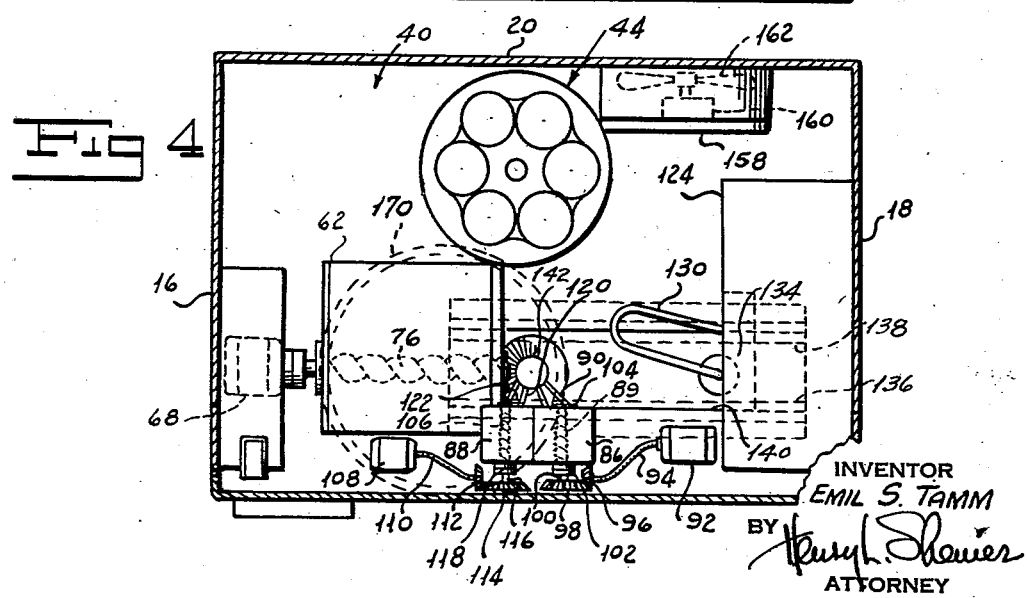
INVENTOR
EMIL S. TAMM
BY
ATTORNEY

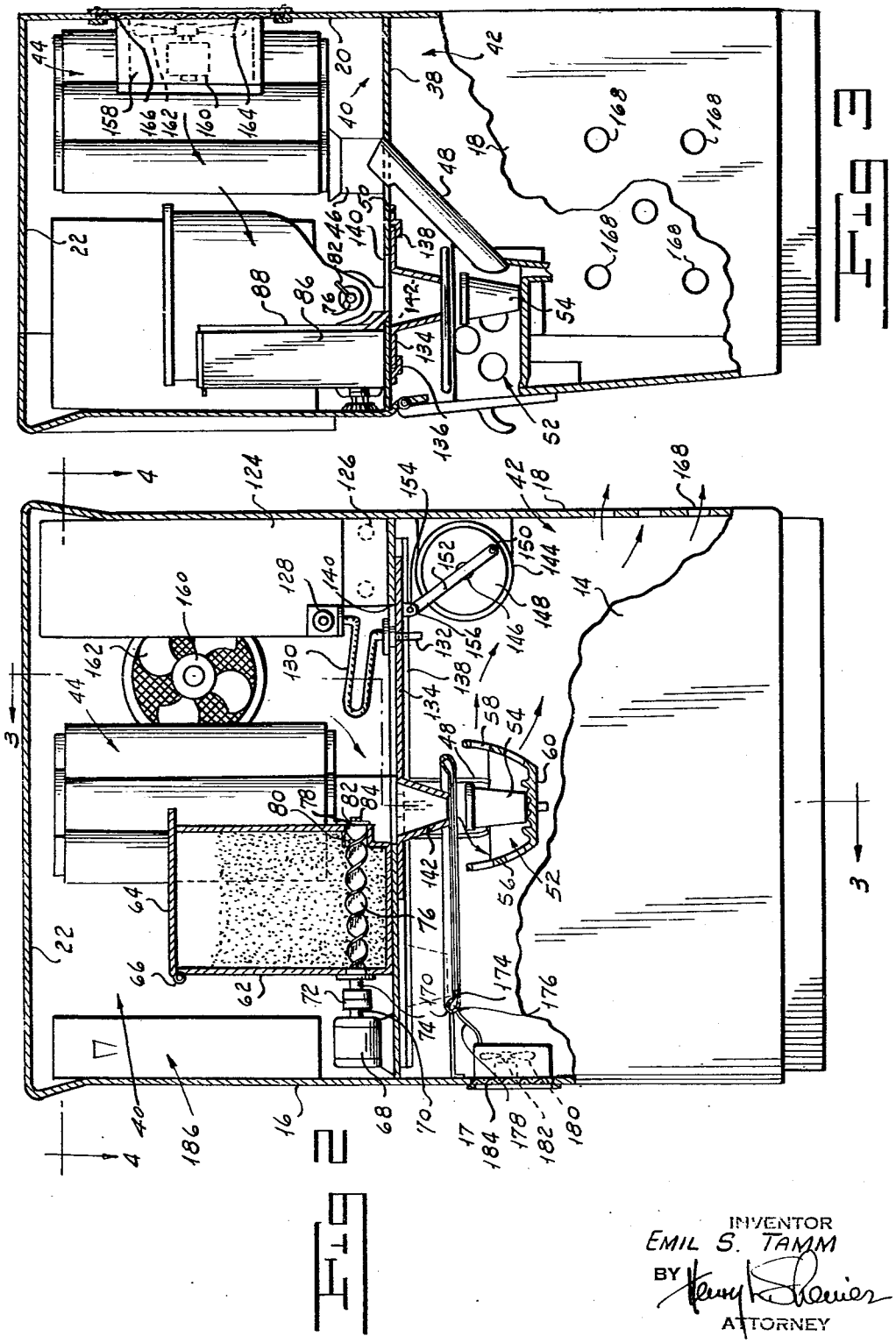

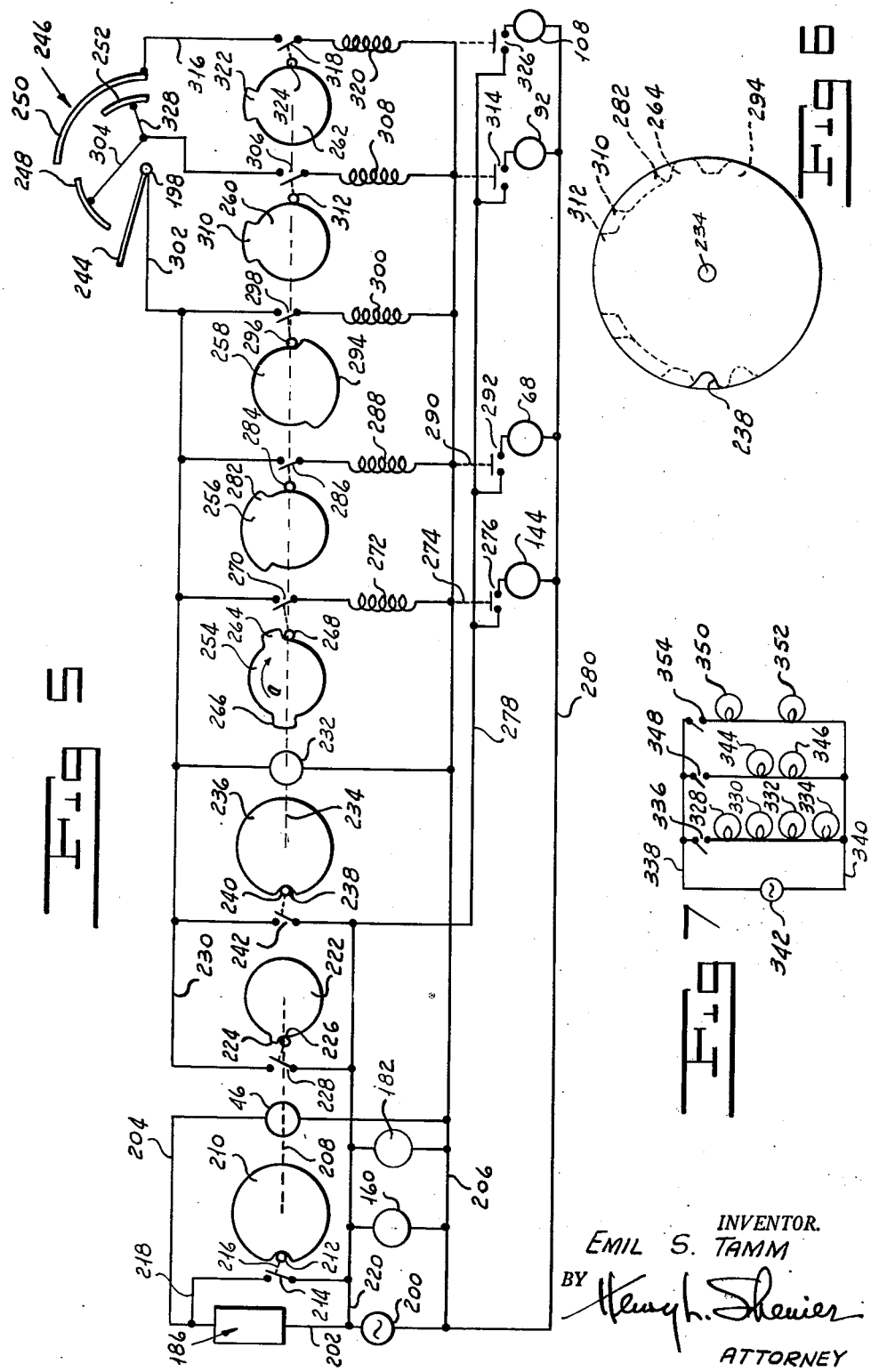

United States Patent Office 2,796,893
Patented June 25, 1957

2,796,893

COFFEE DISPENSING MACHINE

Emil S. Tamm, Morristown, N. J., assignor to Rowe Manufacturing Co., Inc., Whippany, N. J., a corporation of New York Application August 1, 1955, Serial No. 525,629

11 Claims. (Cl. 141—100)

My invention relates to a coffee dispensing machine and more particularly to a coffee dispensing machine which is simple in construction and efficient in operation, and which is sanitary and non-fouling.

In machines for dispensing hot beverages, such as coffee and the like, powdered flavoring components generally are used since they retain their flavor and may be stored for a long period of time. These powdered flavoring components are hygroscopic and tend to cake and form gummy deposits in the presence of moisture, thus fouling the dispenser. In operation of hot beverage dispensing machines predetermined quantities of beverage components, such as powdered coffee, powdered milk, sugar and the like, are mixed with a base beverage constituent, such as hot water. It will be appreciated that quantities of water vapor and steam are released in the course of operation of the machines. These vapors rise and may come into contact with the powdered flavoring components to cake them and form gummy deposits which clog the dispenser. Further, in the course of operation of these machines quantities of powdered beverage components may collect on various surfaces of the machine operating mechanism. If these deposits are not cleared in the course of operation of the machine, they becomes gummy and sticky and may attract vermin which render the machine unsanitary. Frequent cleaning of the machine is one solution to the problem of maintaining a sanitary machine. It will be appreciated that this procedure requires servicing of the machine at frequent intervals and is consequently expensive.

I have invented an improved hot beverage dispensing machine in which the supplies of powdered beverage components are maintained isolated from vapor and steam from the hot water constituent of the beverage. My machine includes means for preventing vapors or steam released during the operation of the machine from coming into contact with the powdered beverage component dispensing means. I have also provided my machine with means for removing deposits of powder which collect on the machine operating parts before steam vapors emanating from the beverage can come into contact with the deposits. My improved machine is simple in construction and efficient in operation.

One object of my invention is to provide an improved coffee dispensing machine which is simple in construction and efficient in operation.

Another object of my invention is to provide an improved coffee dispensing machine which includes means for preventing steam or water vapors released during the operation of the machine from coming into contact with powdered beverage components.

A further object of my invention is to provide an improved coffee dispensing machine having means for removing deposits of powdered drink components which collect on parts of the machine before vapors released during the operation of the machine come in contact with the deposits.

Other and further objects of my invention will appear from the following description.

In general, my invention contemplates the provision of a machine for dispensing a hot beverage, such as coffee, cocoa or tea, into a cup including a source of hot water isolated from the supplies of the various powdered components of the beverage to be mixed with the hot water. I provide means responsive to the selection of a beverage for positioning the cup relative to the powdered component supplies for receiving predetermined quantities of powdered components appropriate to the selected beverage. After the cup has received the quantities of the powdered component, means positions the cup relative to the hot water to receive the proper charge of this constituent. The arrangement of my machine is such that in passing to the cup the powdered components do not pass over the same surface of the machine as does the hot water. My machine includes means for directing vapors away from the supplies of powdered components. It also includes means for collecting quantities of powdered components before they are contacted either by vapors released during the operation of the machine or the hot water.

In the accompanying drawings which form part of the instant specification and which are to be read in conjunction therewith and in which like reference numerals are used to indicate like parts in the various views:

Figure 1 is a front elevation of my improved coffee or other hot beverage dispensing machine.

Figure 2 is a front elevation of my improved coffee dispensing machine with a part broken away and with other parts in section.

Figure 3 is a sectional view of my improved coffee dispensing machine taken along the line 3—3 of Figure 2.

Figure 4 is a sectional view of my improved coffee dispensing machine taken along the line 4—4 of Figure 2.

Figure 5 is a schematic view of one form of selecting means which may be employed with my improved coffee dispensing machine.

Figure 6 is a plan view showing the configuration of certain of the cams employed in my improved coffee dispensing machine.

Figure 7 is a schematic view of one form of empty signal circuit which may be used with my improved coffee dispensing machine.

More particularly referring now to Figures 1 to 4 of the drawings, my improved coffee dispensing machine includes a cabinet, indicated generally by the reference character 10, mounted on a base 12. Cabinet 10 is formed with a front panel or door 14, respective sides 16 and 18, a back 20 and a top 22. Front panel 14 includes a door 24 adapted to be opened by means of a handle 26 to afford access, in a manner to be described hereinafter, to a cup to contain a beverage. A selection rotary switch assembly 28 carried by the panel 14 provides a means by which a customer may select any one of a number of different beverages. A slot 30 is adapted to receive coins inserted in the machine to initiate its operation. A coin return lever 32 slidably mounted in a slot 34 in panel 14 provides a means by which coins deposited in the machine may be returned to the customer through a slot 36 in the exent the supply of the particular beverage desired is exhausted.

A partition 38, supported by any convenient means such as welding, between the back 20 and front panel 14 of the machine divides cabinet 10 into an upper compartment, indicated generally by the reference character 40, and a lower compartment, indicated generally by the reference character 42. Partition 38 supports adjacent back panel 20 a cup supply and delivery mechanism of a type known in the art, indicated generally by the reference character 44. When a dispensing operation is to be performed, a motor 46 associated with the cup delivery mechanism 44 is energized in a manner to be described to deliver a cup to a chute 48 which extends from the cup delivery mechanism through an opening 50 in partition 38.

Front panel 14 supports, behind door 24, a chamber, indicated generally by the reference character 52, to which chute delivers a cup, such as cup 54, during the course of a dispensing operation. Perforated walls 56 and 58 together with a base 60 form chamber 52. It will be understood that chamber 52 is located at the dispensing station of the machine which is the location at which the beverage is delivered to the customer.

Partition 38 carries a canister 62 closed by a top 64 secured to the canister by a hinge 66. Canister 62 may conveniently contain the supply of the major powdered beverage component, such, for example, as powdered coffee or the like. A motor 68 supported on partition 38 adjacent canister 62 drives a shaft 70 connected by a flexible coupling 72 to a shaft 74 which drives a feeder worm 76 rotatably mounted by any convenient means in canister 62. As it rotates a predetermined amount, worm 76 forces a predetermined quantity of the powdered coffee out of canister 62 through an opening 78 formed by a tube 80 extending into canister 62 adjacent its bottom. A wiper 82 carried on the end of worm 76 clears the powdered flavoring component off the peripheral edge of opening 78 as motor 68 drives the worm feeder 76.

I mount other powdered beverage component containers adjacent the canister 62. For example, when my machine is to dispense coffee and auxiliary components, such as powdered cream or powdered milk and comminuted sugar, I mount respective sugar and powdered cream containers 86 and 88 on partition 38 adjacent the coffee canister 62. As can best be seen by reference to Figures 3 and 4, the sugar container 86 has a worm feeder 89 associated with it for delivering a predetermined quantity of powdered or granulated sugar to a chute 90 which delivers the powdered sugar at substantially the same point at which powdered coffee is delivered by worm feeder 76. A motor 92 drives a flexible shaft 94 which drives a bevel gear 96 rotatably carried by any convenient means on partition 38. Gear 96 drives a bevel gear 98 fixed on a shaft 100 connected by a flexible coupling 102 to worm 88. When motor 92 is energized to drive cable 94, worm feeder 89 rotates to deliver a predetermined quantity of powdered sugar to chute 90. The end of worm feeder 89 remote from coupling 102 carries a wiper 104 similar to wiper 82 on feeder 76.

In order to deliver a predetermined quantity of powdered cream or milk from container 88 when the selected beverage includes cream, I rotatably mount a feeder worm 106 in container 88 adjacent its bottom. An electric motor 108 drives a flexible shaft 110 which drives a bevel gear 112 rotatably mounted on partition 38 by any convenient means. Bevel gear 112 drives a gear 114 fixed on a shaft 116 for rotation wtih it. A flexible coupling 118 connects shaft 116 to worm 106. When motor 108 is energized to drive shaft 110, worm 106 rotates to deliver powdered cream or powdered milk to a chute 120 which delivers the powdered material to the cup in the manner to be described hereinafter. Feeder worm 106 may conveniently carry a wiper 122.

As can best be seen by reference to Figure 2, I mount a water tank 124 on partition 38 adjacent side 18. Tank 124 is supplied with water from any convenient source and is provided with a thermostatically controlled heating unit 126 for heating the supply of water contained in the tank. A solenoid operated valve 128 connects the outlet of tank 124 to a length of hose or tubing 130 which connects valve 128 to a hot water nozzle 132.

Referring now to Figures 2 to 4, I mount a slide 134 in a pair of supporting guides 136 and 138 fixed by any convenient means to the underside of platform 38. In the position shown in Figures 2 and 3, slide 134 partially closes a slot 140 formed in platform 38. I form slide 134 with a chute 142 for delivering powdered beverage components to the cup 54 positioned on the base 60 of chamber 52. In the position of slide 134 shown in Figure 2, chute 142 is disposed below the point at which powdered beverage components from canister 62 and from containers 86 and 88 are delivered. It is to be noted that nozzle 132 is carried in slide 134 at a considerable distance from chute 142.

I mount a motor 144 on side 18 of cabinet 10. Motor 144 drives a shaft 146 on which I mount a crank disk 148 for rotation with it. A pin 150 connects a drive link 152 to plate 148. A pin 154 connects the end of link 152 remote from pin 150 to a depending lug 156 formed on slide 134. When motor 144 is energized to drive shaft 146, plate 148 drives link 152 to move slide 134 from the position shown in full lines in Figure 2 to the position shown in broken lines in Figure 2. In this broken line position of slide 134 chute 142 has moved away from cup 54 while nozzle 132 has moved to a position over the cup. I synchronize the operations of my machine in a manner to be described hereinafter so that valve 128 is actuated to deliver a quantity of hot water to cup 54 when nozzle 132 is positioned over the cup.

It will be seen that the supplies of powdered beverage components for the beverages to be dispensed are located some distance from the supply of the hot liquid base constituent. The powdered flavoring components are not delivered to cup 54 through the same opening as is the hot water. In making the beverage, the powdered beverage components do not come into contact with the same surfaces as does the hot water. It will be understood further that in the broken line position of slide 134 when the hot water is being supplied to cup 54, slide 134 acts as a baffle to prevent passage of vapors or steam up from the cup to the powdered coffee supply. In order to ensure that no vapors remain in the region of the powdered coffee delivery opening, I mount a blower 158 on the back 20 of the machine. Blower 158 includes a motor 160 which drives a fan 162 which draws air through a screen 164 secured over an opening 166 in the back of the machine by any convenient means and scavenges the cabinet. The path of flow of the air drawn into the machine by fan 162 is indicated by the arrows in Figures 2 and 3. While fan 162 draws outside air into the cabinet, it is to be understood that air from the cabinet may be exhausted, if desired, by reversing fan rotation. It will be seen that with the slide or baffle 134 in the full line position shown in Figure 2, the air flows downwardly through chute 142 and through the perforated walls 56 and 58 and thence out through perforations 168 in sides 16 and 18. The air stream clears chute 142 of particles of powdered components which otherwise would collect on the surface of the chute. With slide 134 in the broken line position shown in Figure 2, the air blown in by fan 162 pressurizes the top compartment to prevent vapors from seeping up into the top compartment.

A bracket fixed by any convenient means to side 16 supports an annular duct 170. I form duct 170 with an inwardly directed peripheral opening 174 communicating with a passage 176. I connect a suction tube 178 to passage 176. A suction fan 180 driven by a motor 182 draws air out of passage 176 and out through a screened opening 184 in side 16. The suction provided by fan 180 is continuous with the result that any floating air borne powder is withdrawn through opening 174 and thus prevented from accumulating on the adjacent parts in the form of gummy deposits. It will be appreciated that duct 170 and its associated structure form a suction manifold.

My machine includes a coin register, indicated generally by the reference character 186, of any suitable type known to the art, mounted on side 16. Coin register 186 receives coins from coin slot 30 and initiates operation of the machine after a selection has been made.

In the form of my machine shown, selection assembly 28 provides for four positions corresponding to four respective selections of beverage. The selections may be indicated by any convenient means, such as legends or the like, located at points 188, 190, 192 and 194 of the assembly 28 adjacent the four respective positions of a selecting arm 196 which is mounted on a shaft 198 pivotally mounted in panel 28.

Referring now to Figures 5 and 6, one form of selecting and operating circuit which may be used with my dispensing machine includes a source 200 of electrical potential. A conductor 202 connects coin register 186 to source 200. Respective conductors 204 and 206 connect the cup delivery motor 46 across the series-connected coin register and source 200. When a number of coins aggregating the purchase price of a cup of coffee or the like have been deposited in the slot 30, coin register 186 momentarily completes the circuit of motor 46 in a manner known to the art. Motor 46 drives a shaft 208 carrying a follow through cam 210 for rotation with it. Cam 210 is adapted to engage a cam follower roller 212 which closes a holding switch 214 by means of a linkage 216. I connect switch 214 across coin register 186 by respective conductors 218 and 220. When the circuit of coin register 186 is momentarily closed by the deposit of coins in slot 30, motor 46 is energized to drive shaft 208 and cam 210 in a direction to move follower 212 to close switch 214 to maintain the circuit of motor 46 for a single revolution. At the end of a revolution follower 212 again falls into the recess of cam 210 and switch 214 opens to interrupt the circuit of motor 46.

Shaft 208 carries a second cam 222 formed with a projection 224 for engaging a cam follower 226 which operates a switch 228 connected between conductor 220 and a conductor 230. The location of projection 224 on cam 222 is such that follower 226 is moved to close switch 228 as motor 46 completes a single revolution. When switch 228 closes, it completes the circuit of a selecting cam drive motor 232 connected between conductors 230 and 206. Motor 232 drives a shaft 234 which carries a follow through cam 236 for rotation therewith. Cam 236 is formed with a recess 238 in which a cam follower roller 240 normally rests. When motor 232 is energized, cam 236 forces roller 240 out of recess 238 to close a switch 242 connected between conductor 230 and conductor 220. Cam 236 maintains switch 242 closed until shaft 234 of motor 232 makes a single revolution.

Shaft 198, which is positioned by pointer 196, carries a contact arm 244 for rotation with it. In a position of arm 196 which corresponds to the selection represented by legend 188, contact arm 244 does not engage any of the conducting segments of a selecting switch, indicated generally by the reference character 246. In the position of pointer 196 corresponding to legend 190, arm 244 engages a conducting segment 248. In the position of pointer 196 corresponding to legend 192, contact arm 244 engages a conducting segment 250. In the position of pointer 196 corresponding to legend 194, contact arm 244 engages both segment 250 and a conducting segment 252.

Shaft 234 carries for rotation with it a shelf motor actuating cam 254, a powdered coffee delivery motor actuating cam 256, a hot water solenoid actuating cam 258, and respective powdered sugar and powdered cream delivery motor actuating cams 260 and 262. Cam 254 carries a pair of projections 264 and 266, each adapted to actuate a follower 268 to close a switch 270 connected in series with a relay winding 272 between conductors 230 and 236. When shaft 234 rotates in the direction of the arrow as in Figure 5, projection 264 moves follower 268 to close switch 270 to energize relay winding 272. Winding 272, when energized, operates a linkage 274 to close a normally open relay 276 connected in series with motor 144 between a conductor 278 connected to conductor 220 and a conductor 280 connected to conductor 206. It is to be understood that before a dispensing operation, slide 134 rests in the broken line position shown in Figure 2. When switch 270 is closed by the action of cam projection 264, motor 144 is energized to move slide 134 to the full line position shown in Figure 2. When follower 268 leaves projection 264, switch 270 opens and motor 144 is de-energized.

After motor 144 stops, a projecting surface 282 on cam 256 engages a follower 284 to close a switch 286 connected in series with a relay winding 288 between conductors 230 and 206. When energized, relay winding 288 operates a linkage 290 to close a normally open relay 292 connected in series with motor 68 between conductors 278 and 280. While shelf 134 is in the full line position shown in Figure 2 and while follower 284 is engaged by cam surface 282, motor 68 is energized to drive worm feeder 76 to deliver powdered coffee to cup 54 through chute 142. When follower 284 leaves surface 282, motor 68 is de-energized.

If black coffee has been selected by the customer, no further drink components are dispensed during the drink drawing operation. Shortly after follower 284 leaves surface 282, projection 266 on cam 254 engages follower 268 to close switch 270 to energize motor 144 to return shelf 134 to the broken line position shown in Figure 2. When follower 268 leaves projection 266, motor 144 is again de-energized and shelf 134 remains in the broken line position until a succeeding dispensing operation. With shelf 134 in the broken line position, nozzle 132 is positioned over cup 54.

Shortly after follower 268 leaves projection 266, the raised surface 294 of cam 258 engages a follower 296 to close a normally open switch 298 connected in series with a solenoid winding 300 between conductors 230 and 206. When energized, solenoid winding 300 opens valve 128 to permit hot water to flow through nozzle 132 into cup 54. This flow continues until follower 296 leaves surface 294, at which time follower 240 drops into the recess 238 of cam 236 to interrupt the circuit of the cam drive motor 232. When this occurs, the machine is ready for the next dispensing operation.

If the customer wishes to select coffee with sugar and no cream, he moves pointer 196 to a position corresponding to legend 190 to engage contact arm 244 with conducting segment 248 of switch 246. A conductor 302 connects arm 244 to conductord 230. A conductor 304 connects segment 248 to a normally open switch 306 connected in series with a relay winding 308 connected to conductor 206. Cam 260 carries a projection 310 which occupies a sector on shaft 234 which is included in the sector occupied by surface 282. At one point during the period of time when surface 282 of cam 256 engages its follower 284 to deliver powdered coffee to the cup, projection 310 on cam 260 engages a follower 312 to close switch 306. If arm 244 engages conducting segment 248, relay winding 308 is energized to close a normally open relay 314 connected in series with motor 92 between conductors 278 and 280. Motor 92 is energized by the closing of relay 314 and remains energized while projection 310 engages follower 312 to drive worm feeder 89 to deliver sugar to spout 90 which directs the sugar through chute 142 to cup 54. The remainder of the dispensing cycle proceeds in the manner described hereinabove.

If a customer wishes to select coffee with cream and no sugar, he moves pointer 196 to the position corresponding to legend 192 to engage arm 244 with segment 250. A conductor 316 connects segment 250 to a normally open switch 318 connected in series with relay winding 320 connected to conductor 206. Cam 262 carried by shaft 234 is formed with a projecting surface 322 which occupies a sector on shaft 234 included in the sector occupied by surface 282 of cam 256. At a predetermined point during the period of engagement of surface 282 with follower 284, surface 322 engages a follower 324 to close switch 318. If arm 244 is in engagement with segment 250, winding 320 is energized to close a normally open relay 326 connected in series with motor 108 between conductors 278 and 280 to energize motor 108. Motor 108 remains energized while projection 322 engages follower 324 to drive worm feeder 106 to deliver powered cream or milk to spout 120 which directs the powdered cream to cup 54 through chute 142. When follower 324 leaves surface 322, motor 108 is de-energized and the rest of the dispensing cycle proceeds as is described hereinabove.

If a customer desires to select coffee with both cream and sugar, he moves pointer 190 to a position corresponding to legend 194 to move arm 244 to engage a segment 252. A conductor 328 connects segment 252 to switch 306. It will be seen that in this position of arm 244 it contacts both segment 250 and segment 252. As a result when the respective surfaces 310 and 322 engage their followers 312 and 324, motors 92 and 108 both are energized to deliver predetermined quantities of sugar and powdered cream to cup 54. When followers 312 and 324 leave the respective surfaces 310 and 322, motors 92 and 108 are de-energized and the rest of the dispensing cycle proceeds as is described hereinabove. For purposes of clarity I have shown the layout of the respective cam surfaces of the cams driven by motor 232 in Figure 6.

I connect the respective blower motors 160 and 182 between conductors 220 and 206 directly across source 200 so that the motors are continually energized.

As can be seen by reference to Figure 7, I provide empty signal means for indicating when the respective supplies of any of the types of beverage dispensed by the machine are exhausted. I connect four bulbs 328, 330, 332 and 334 in series with a normally open switch 336 between respective conductors 338 and 340 connected to the terminals of a suitable source of electrical potential 342. I connect a pair of bulbs 344 and 346 in series with a normally open switch 348 between conductors 338 and 340. I connect a pair of bulbs 350 and 352 in series with a normally open switch 354 between conductors 338 and 340. The respective switches 336, 348 and 354 are of any suitable type known to the art and are associated with the respective coffee canister 62 and sugar and cream containers 86 and 88. I arrange lamp 334 adjacent the legend 188, lamps 330 and 344 adjacent the legend 190, lamps 328 and 350 adjacent legend 192, and lamps 332, 346 and 352 adjacent legend 194. If the machine is out of its supply of powdered coffee, switch 336 closes in a manner known to the art to complete the circuit of lamps 328, 330, 332 and 334. Consequently, a bulb will be lighted near each of the respective legends on the selecting panel 28 and the customer is informed that the machine is incapable of dispensing any beverage. If the machine is out of its supply of sugar, switch 348 closes in a manner known to the art to light lamps 344 and 346 adjacent the respective legends 190 and 194 corrresponding to coffee with sugar and to coffee with cream and sugar. If the supply of cream is exhausted, switch 354 closes in a manner known to the art to light bulbs 350 and 352 adjacent the respective legends 192 and 194 corresponding to coffee with cream and to coffee with cream and sugar.

In operation of my machine, a customer first moves pointer 196 to a position corresponding to the type of beverage desired. He then deposits coins in slot 30 aggregating the purchase price of the beverage. Coin register 186 momentarily completes the circuit of motor 46 to initiate a cup delivery. Cam 310 maintains this circuit for a single revolution of shaft 208 to ensure delivery of a cup. At a point near the end of a revolution of shaft 208 driven by motor 46, cam projection 224 closes switch 228 to energize cam drive motor 232. Follow through cam 236 maintains the circuit of motor 232 for a single revolution. It will be remembered that initially slide 134 is in its broken line position shown in Figure 2. When motor 232 drives its shaft 234, projection 264 closes switch 270 to energize motor 144 to move slide 134 to the full line position shown in Figure 2. After slide 134 has been shifted to this position, cam surface 282 closes switch 286 to energize motor 68 to drive feeder worm 76 to deliver powdered coffee to cup 54 through chute 142. If the customer has selected a beverage which includes either sugar or cream, or both, either motor 92 or motor 108, or both motors, are energized when the respective cam surfaces 310 and 312 close switches 306 and 316. When follower 284 leaves surface 282, both folowers 312 and 324 have left the respective surfaces 310 and 322 and all the necessary flavoring components have been delivered to cup 54. When this occurs, projection 266 engages follower 268 again to energize motor 144 to return slide 134 to the broken line position shown in Figure 2. In this position of the slide, nozzle 134 is disposed over cup 54. After slide 134 has been moved to the broken line position, surface 294 of cam 258 closes switch 298 to energize solenoid 300 to open valve 128 to deliver a predetermined quantity of water to the cup through nozzle 132. After the water has been delivered, follower 240 falls into recess 238 and the circuit of motor 232 is interrupted. The machine is then ready for the next dispensing operation.

It is to be understood that in the course of operation of my machine both fans 162 and 180 are continuously driven. The air current from fan 162 directs any vapors in the upper chamber 40 down into the lower chamber 42 and out through the perforated sides of the machine. At the same time, the suction provided by fan 180 draws any air borne powdered material out through the side of the machine through the chamber 176. Thus I avoid clogging of the powdered component supply canisters and also prevent the formation of unsanitary gummy deposits on the machine.

It will be seen that I have accomplished the objects of my invention. I have provided a hot beverage dispensing machine for dispensing hot beverages in a simple and efficient manner. I provide my machine with means for directing vapors, such as steam, away from the powdered flavoring components of the beverage. My machine includes means for preventing quantities of powder from being deposited on the machine parts and prevents them from gumming or caking. My machine is simpler in construction than machines of the prior art.

It will be understood that certain features and subcombinations are of utility and may be employed without reference to other features and subcombinations. This is contemplated by and is within the scope of my claims. It is further obvious that various changes may be made in details within the scope of my claims without departing from the spirit of my invention. It is therefore to be understood that my invention is not to be limited to the specific details shown and described.

Having thus described my invention, what I claim is:

1. A machine for dispensing a beverage at a dispensing station including in combination a supply of hot water, supply of a powdered beverage component, means for discharging hot water from the hot water supply to the dispensing station, means for guiding a charge of the beverage component from the beverage component supply to the dispensing station, means mounting said discharging and guiding means in spaced relationship and means responsive to the operation of said machine for moving said mounting means alternately to position said discharging means adjacent said dispensing station when said guiding means is remote therefrom and to position said guiding means adjacent said dispensing station when said discharging means is remote therefrom.

2. A machine for dispensing a beverage at a dispensing station including in combination a cabinet, a partition located over said dispensing station and dividing said cabinet into an upper compartment and a lower compartment, a hot water supply in said upper compartment, a supply of a powdered component in said upper compartment, said partition being formed with an opening, a baffle, means mounting said baffle for sliding movement with respect to said opening, respective means carried by said baffle in spaced relationship for conducting a charge of hot water and a charge of said powdered component from the respective hot water and powdered component supplies to the dispensing station and means responsive to the operation of said machine to move said baffle first to position the powdered component conducting means adjacent said dispensing station and then to position said hot water conducting means adjacent the dispensing station.

3. A machine for dispensing a beverage as in claim 2 in which said baffle partially closes said partition opening when said powdered component conducting means is disposed adjacent the dispensing station, said baffle substantially completely closes said opening when said hot water conducting means is disposed adjacent the dispensing station and means for blowing air into said upper compartment.

4. In a machine as in claim 2, a suction manifold positioned adjacent said dispensing station, means for drawing air out of said suction manifold and means providing communication between the area in proximity to said dispensing station and the interior of said suction manifold.

5. In a machine as in claim 2, an annular duct surrounding the dispensing station, means for creating a reduced pressure inside of said annular duct and means providing communication between the area in proximity to said dispensing station and the interior of said duct.

6. A machine for dispensing a beverage at a dispensing station including in combination a cabinet, a partition located over said dispensing station and dividing said cabinet into an upper and a lower compartment, a hot water supply disposed in said upper compartment, a supply of a powdered component disposed in said upper compartment, said partition being formed with an opening over said dispensing station, a baffle, means slidably mounting said baffle adjacent said opening, respective means carried by said baffle in spaced relationship for conducting a charge of hot water and for conducting a charge of said powdered component from the hot water and the powdered component supplies to the dispensing station, means for moving said baffle to a first position with said powdered component conveying means over said dispensing station, means for delivering a charge of said powdered component to the component conducting means when said baffle is in its first position, said baffle moving means being arranged to move said baffle to a second position with the hot water conducting means over the dispensing station and means for delivering a charge of hot water to the hot water conducting means with said baffle in the second position.

7. A machine as in claim 6 in which said baffle has an initial position, a cup delivery mechanism and means for actuating said cup delivery mechanism when said baffle is in its initial position, said baffle moving means being arranged to move said baffle from said initial position to said first position to said second position, said initial position being the same as said second position.

8. A machine as in claim 6 in which said baffle in its first position substantially closes said partition opening and means for directing a stream of air from said upper compartment to the lower compartment through said powder component conducting means.

9. A machine as in claim 6 in which said baffle in its second position substantially closes said partition opening and means for directing a stream of air into said upper compartment to increase the pressure therein.

10. A machine as in claim 6 in which said hot water conducting means comprises a nozzle mounted in said baffle and a flexible tubing connecting said nozzle to said hot water supply.

11. A machine as in claim 6 in which said hot water conveying means comprises a nozzle, said powdered component conducting means comprises a chute carried by said baffle, said nozzle being mounted in said baffle in spaced relationship with the chute.

No references cited.